United States Patent [19]

Williamson et al.

[11] Patent Number: 4,534,813
[45] Date of Patent: Aug. 13, 1985

[54] COMPOUND CURVE-FLAT PATTERN PROCESS

[75] Inventors: Robert D. Williamson, St. Charles; Sidney M. Furst, Maryland Heights, both of Mo.

[73] Assignee: McDonnell Douglas Corporation, Long Beach, Calif.

[21] Appl. No.: 402,051

[22] Filed: Jul. 26, 1982

[51] Int. Cl.³ ............... B29C 17/04; B65H 81/00; B32B 31/00
[52] U.S. Cl. .................. 156/212; 156/58; 156/59; 156/191; 156/194; 156/265; 156/297
[58] Field of Search ............ 156/64, 190-194, 156/58-59, 212, 63, 213, 264, 265, 297

[56] References Cited

U.S. PATENT DOCUMENTS

| | | | |
|---|---|---|---|
| 3,503,820 | 3/1970 | Galbato | 156/191 |
| 3,539,410 | 11/1970 | Meyer | 156/58 |
| 3,622,323 | 11/1971 | Fraser | 156/58 |
| 3,700,535 | 10/1972 | McCoy et al. | 156/190 |

*Primary Examiner*—Edward Kimlin
*Assistant Examiner*—Merrell Cashion
*Attorney, Agent, or Firm*—Gregory A. Cone; George W. Finch; Donald L. Royer

[57] ABSTRACT

Flat pattern equivalents for curved surfaces may be generated by developing a regular network of quadrilateral grid elements resembling a fish net which is mathematically smoothed onto the curved surface. Surface features such as boundaries and cutouts are mapped onto the network. The network is then transformed onto a flat mapping plane to form a grid in a manner analagous to smoothing a fish net mesh onto a flat surface. The surface features are then transformed to the flat surface grid.

Individual plies or parts are then cut based upon the flat patterns. The plies or parts will conform to the curved surface exactly.

11 Claims, 17 Drawing Figures

MAPPING PLANE

COMPOUND CURVE-FLAT PATTERN PROCESS

A source code listing of a computer program labelled FISHNET is included as a microfiche appendix.

BACKGROUND OF THE INVENTION

1. Field of the Invention

This invention relates to methods for forming flat pattern equivalents for curved surfaces. It is particularly useful in accurately transforming originally flat deformable materials such as sheet metal, glass and woven cloth into precise compound curved surfaces.

2. Description of the Prior Art

The method of this invention is particularly useful but not limited to the fabrication of high strength resin-matrix composites which are formed into parts with complex curved shapes. The term "composite" refers to material made up of two or more separate components. Carbon fiber resin matrix composites are particularly useful because of their high strength-to-weight ratio and high resistance to crack growth. One method of making a carbon fiber resin matrix composite component is to impregnate the carbon fiber fabric with resin, partially cure the impregnated fabric to a "B" stage, bring the separate layers or plies of the fabric together in a suitable tool/mold, and then completely cure the laminate under suitable heat and pressure conditions.

On a flat, constant thickness component, cutting the laminate is a simple operation. However, for components with contours or compound curves, a flat pattern must be made for each ply or sets of plies. There are a number of methods to approximate the flat pattern equivalent for the compound curve shape; one of the most common is known as the "triangulated flat pattern" method. In this method the compound curve shape is first approximated as a ruled surface, and then triangulation is used to transform the points from a three dimensional to a two dimensional surface. Unfortunately, as the complexity of the compound surface increases, the fit of the flat pattern becomes increasingly dependent upon the skill, judgment and experience of the designer and the inaccuracy of the assumption of a ruled surface. When dealing with complex shapes, unless the skill level of the designer is quite high, commonly the flat pattern will not fit. Since a composite part is often made up of as many as 150 layers of fabric, the task of obtaining flat patterns is laborous and susceptible to errors. Indeed, some complex shapes are so intricate that they may not be flat patterned by any existing method. In such cases a full scale model of the surface must first be built, and sheets of Mylar plastic are then positioned upon the tool, and the edge of the part and features are marked on the sheets. The resulting flat patterns are still not precise since the Mylar plastic does not deform in the manner of a fabric. Clearly, with the increased use of resin-matrix composite structures, a more accurate method for producing flat patterns is needed.

SUMMARY OF THE INVENTION

This process for determining a flat pattern equivalent for a portion of a curved surface comprises: first forming two tooling lines upon the surface which intersect at a collation reference point; then forming a fish net-like grid upon the surface such that one of the grid intersections coincides with the collation reference point, and the grid lines extending outward from this intersection coincide with the tooling lines upon the surface; then marking the intersections of the perimeter of the relevant portion of the curved surface with the grid; then forming a flat mapping grid having a grid spacing equal to the grid spacing of the fish net-like grid; and, finally, determining the flat pattern equivalent for the portion of the compound curved surface by transforming the fish net-like grid containing the marked intersections onto the flat mapping grid.

DETAILED DESCRIPTION OF THE INVENTION

Figure 1:
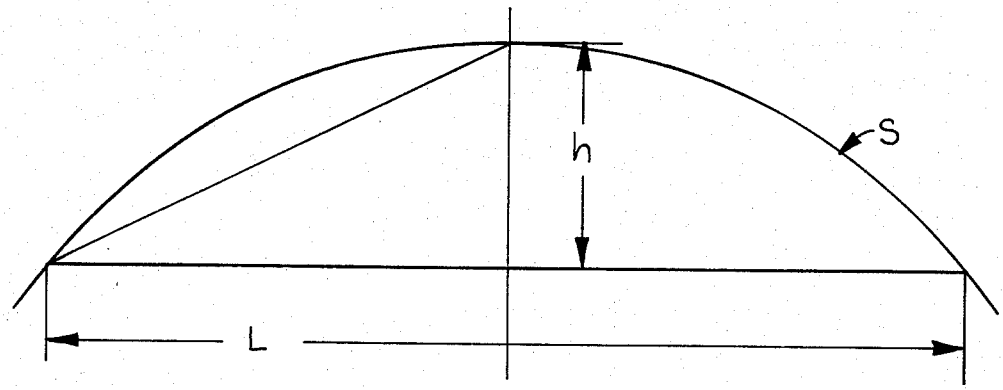
FIG. 1 is a mathematical diagram.

As mentioned above, heretofore there has been no efficient and accurate method available for the production of flat pattern equivalents for compound curved surfaces. We have invented a method which accurately describes the behavior of a material undergoing compound deformation and which can be used to generate a flat pattern of the surface. The flat pattern will fit the curved surface exactly. Additionally, information will be generated by this method which will inform the designer of potential darts, folds and wrinkles in the material when applied to the curved surface. The flexibility of this process allows the designer to initiate the flat pattern generation process at any point on or off of the compound curved surface. A further advantage is that, unlike any other known method, this process generates information relative to positioning the flat pattern on the lay-up or forming tool, thereby facilitating the automation of the lay-up or forming process. Additionally, this process assures the designer that the flat pattern will be laid up in its proper orientation relative to the other plies in a composite structure. A perfect fit is of great importance in locations such as interior plies in composites where there can be no trimming after the part has been laid up and cured. In other materials the need for accuracy still holds, even though as much as 18 inches of material is allowed from the edge of the part for gripping the part for the forming process.

This method is based on a simulation of the actual behavior of a material undergoing the deformations associated with its conformation to a compound curved surface. Any type of feature, including cutouts and rivet patterns, can be developed on the flat pattern. The great accuracy of this method is also beneficial in terms of weight computations, material savings, and intermediate hand trimming operations.

One embodiment of this method defines "points" as being the points of intersection of the woof and warp of the cloth on the curved surface. For other, non cloth-like materials such as metal sheet or glass, the "woof" and "warp" directions are the neutral axes of the material. The "points" for such materials are arbitrarily chosen since there are no woof and warp yarns. However, this method can accurately model the deformation behavior of these materials. In order to simplify the mathematics and to reduce the number of calculations, an assumption is made that any distance between points is defined as the chordal distance between the points along the axis directions. The difference between the theoretical and actual tolerance of the part comes into play at this point. If the distance from point to point were measured along the curve, then the flat pattern would be exact. Since the points are computed along a straight line distance from point to point, the difference between the actual distance along the curve and the straight line distance is the error within that particular measurement. Summing the errors along an axis direction will result in the total error within the part. It can be shown that, even though the points are computed as chordal distances, the error is still very small. In other words, the total error in the part may be minimized by minimizing the length of the individual chords used in the calculations based on the curvature of the part.

An initial decision must be made as to the spacing between the points in the fish net-like grid. Again, the accuracy of the method may be related to the grid spacing. FIG. 1 shows a portion of a curved surface, s, having a radius of curvature, R, not shown, a chord of length, L, and a height, h. The relevant equations are: $R = L^2/8h + h/2$; $\theta = s/R$; and total error $= R\theta - 2R \sin \theta/2$. The total arc length (s) is 49.975647277 inches, the base chord length (L) is 48.0000 inches, and the radius of curvature (R) is 51.0000 inches. For the purposes of demonstration, three computations were made using a 1.00 inch, a 0.25 inch, and a 0.05 inch grid spacing (chord length). The total arc length (s) of the part is, again, 49.975647277 inches. The use of a 1.00 inch grid spacing (chord length) would require 47.999231047 chords with a total error of 0.00076895248. The use of a 0.25 inch spacing would require 199.90238896 chords with a total error of 0.00005003556 inches. The use of a 0.05 inch spacing would require 959.9999616 chords with a total error of 0.00000191999 inches. It should be noted that a part of dimensions 49.97 inches by 49.97 inches with one inch spacings would have 2,401 computed points (grid intersections on the surface); with 0.25 inch spacing, 39,601 computed points; and with 0.05 inch spacing, 998,001 computed points. Therefore, a compromise must be made between a very high degree of accuracy and an unreasonable amount of grid intersection points. The advantage of the 1.0 inch spacing is that it requires fewer computations. For the purposes of this discussion and example, a spacing of 0.35 inches will be used.

The remainder of this specification will be devoted to the discussion of two embodiments of this process. The first embodiment will be a rather simple approach which will serve mainly as an explanatory tool, although it could be utilized as a production process. The second embodiment is more complicated and is intended as a production process to be used in conjunction with a computer graphics system having a capability to mathematically handle a three dimensional curved surface.

Embodiment No. 1

Figure 2:
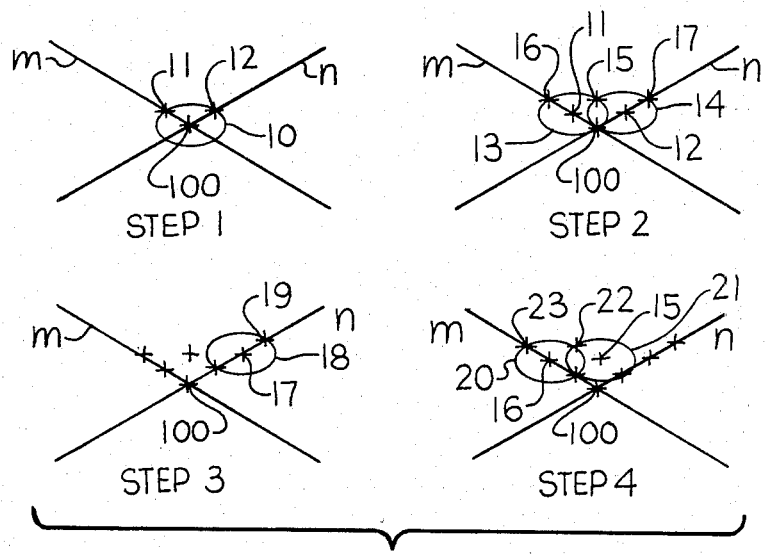
FIG. 2 is a series of geometric construction steps useful in this process.
Figure 3:
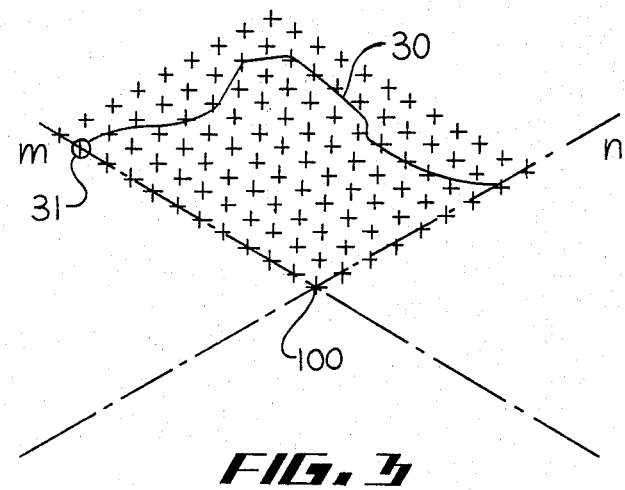
FIG. 3 shows the fish net-like grid produced in one quadrant by the geometrical construction steps of FIG. 2.
Figure 4:
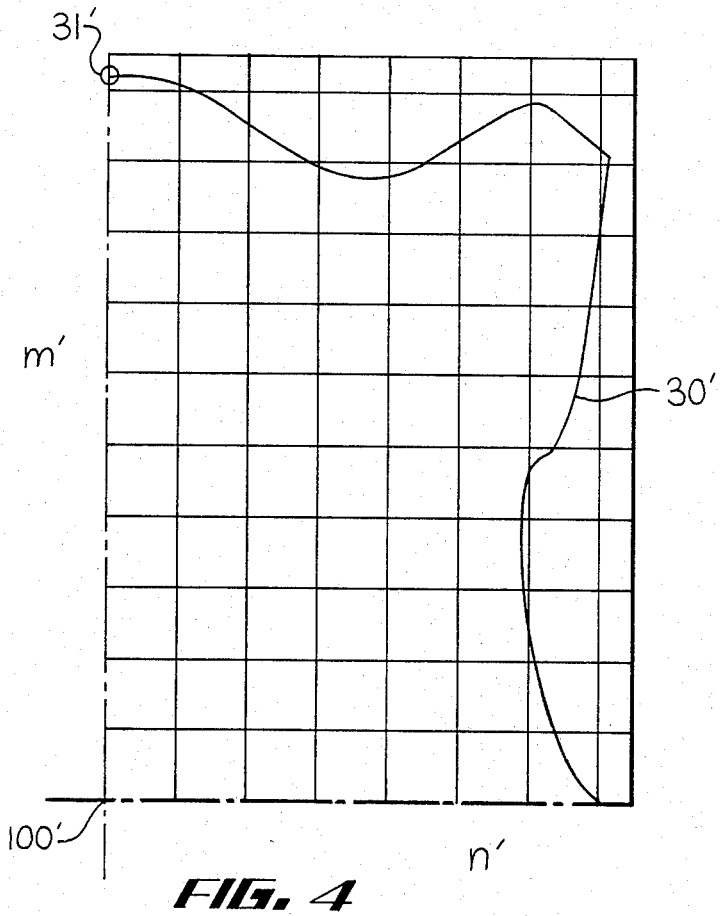
FIG. 4 shows the flat pattern equivalent to the quadrant of FIG. 3.

First, a model of the surface for which a flat pattern is desired must be constructed or generated. Two lines are then drawn on this surface which intersect each other at a predetermined starting point. These lines represent the axis of the material and are designated the tooling lines. These lines are generally started with an angle of 90° between them because that is the condition of the material in its undeformed state. It should be noted that the lines do not have to be at right angles to each other as the angle would represent the axes of the material in a predeformed condition. That is, the material is deformed to some degree prior to its being positioned on the layup tool. This would primarily be applied to a woven material. FIG. 2 shows the sequence of steps by which the fish net-like grid of intersecting points is generated upon the curved surface. Step 1 of FIG. 2 shows the tooling lines m, n which intersect at right angles at the starting point 100. A circle is then constructed with its origin at point 100 having a radius equal to the desired spacing interval or chord length of 0.35 inches. In this discussion the grid will be developed one quadrant at a time. As such, the intersections of the circle 10 with the tooling lines m and n at points 11 and 12 are indicated. Two further circles 13 and 14 are then constructed having their origins at points 11 and 12 respectively. The intersections of these new circles with the tooling lines m and n are then marked as points 16 and 17 respectively, and the intersections with each other at point 15 are also marked. Similarly, in steps 3 and 4, further circles are constructed with their centers at points 15, 16 and 17 which form further intersection points with the m and n axis labelled 23 and 19 respectively. More and more grid intersection points within the quadrant are then constructed by this algorithm until a complete quadrant between the tooling lines is completed in the manner shown in FIG. 3. The object of these intersected circles is then to generate a network of points, on the surface of the part, which are all the same chordal distance away from each other. This figure also shows the perimeter 30 of the compound curve surface within the quadrant of interest. Once the grid intersection network has been completed within this quadrant, the transformation from this curved surface to the flat surface mapping plane shown in FIG. 4 will be commenced. The first point to be transformed onto the flat surface mapping plane is the intersection of the perimeter 30 with the m tooling line at point 31. It is important to note at this point that the grid intersections coincide consecutively along both the m and n tooling lines. Point 31 falls 0.1 inches past the tenth grid intersection point along the m axis and as such is (10) (0.35 inches) + 0.1 inches = 3.6 inches along the m tooling line. The flat pattern mapping grid shown in FIG. 4 is laid out with the grid spacing of 0.35 inches, the same spacing as was used on the curved surface in FIGS. 2 and 3. The transformed axes are shown as m' and n' with a translating starting point of 100'. Thus, the transformed point 31' will appear at 3.6 inches out along the m' axis on the flat pattern. In a similar manner, further intersections of the perimiter 30 with the curved surface grid shown in FIG. 3 will be similarly transferred onto the flat pattern mapping grid shown in FIG. 4 where the perimeter appears as the line 30'. FIG. 4, then, shows the flat pattern equivalent to the curved surface outline for this particular quadrant. The process would then be repeated for the remaining three quadrants until the total perimeter of the portion of the curved surface for which is desired a flat pattern has been completed.

Once this flat pattern equivalent for the part is generated in its undeformed condition, the woven material would be cut out and laid up on the layup tool. The starting point and axis lines which were developed on the surface are either optically projected or drawn on to the layup tool. The material has a collation reference point and axis lines marked upon it as well. If the material is cloth, then it is positioned on the layup tool such that the starting point and woof (or axes) and warp lines and the projected lines coincide.

If the flat pattern is cut out and the axis lines are positioned to correspond to the tooling lines on the surface, the flat pattern will fit the surface exactly. Another way to lay up a clothlike material is to line up one edge of the flat pattern at a time with the edge of the layup tool and then work the cloth into the tool. This is the way most layup work is done at present.

Embodiment No. 2

A more efficient way to utilize this compound curve flat pattern method is to employ a computer graphics system. For this particular embodiment, the system which was used in the development of the method was an Evans and Sutherland Picture System 2 (PS-2) display processor unit. The three-dimensional data describing the curved surface are received at the PS-2 from a Digital Equipment Corporation (DEC) 11/70 minicomputer which is cable connected to the display processor. Each 11/70 minicomputer can operate up to four PS-2 microprocessors (eight consoles). The DEC 11/70 communicates with a DEC 11/34 minicomputer that is located near and cable connected to a main frame IBM 370 computer. However, this method may be employed upon any existing computer graphics system of sufficient capability.

First, a mathematical description of the surface of the part being flat patterned must be obtained. Parametric cubic (PC) geometry is a mathematical technique for describing bounded three dimensional curves and surfaces in a form useful to engineering design and analysis. As an integral part of computer-aided design, PC geometry satisfies the need for speed, accuracy, economy, and manipulative flexibility required to solve complex engineering problems. For curves, each real space coordinate, X, Y, and Z, is expressed as a cubic polynomial function of an independent parameter, U. Thus, the X-coordinate of any point on a space curve may be expressed as:

$$x = \sum_{i=0}^{3} a_{xi} u^i$$

for surfaces, each real space coordinate is expressed as a bicubic function of two independent parameters, U and W. Thus, the X coordinate of any point on a surface may be expressed as:

$$x = \sum_{i=0}^{3} \sum_{j=0}^{3} a_{xi} u^i w^j$$

where a given set of coefficients, $a_{xi}, a_{yi}, a_{zi}$, defines a unique, unambiguous curve in space, and a second given set of coefficients, $a_{xij}, a_{yij}, a_{zij}$, defines a unique, unambiguous surface in space; and where the values of the parametric values U and W are limited to the interval between zero and 1, inclusive.

Parametric representation is used because it allows independent control of each real space coordinate by employing a common, independent parameter, (U for curves, U, W for surfaces). It follows the representation of bounded curves and surfaces through the axiomatic and explicit concept of domain. Nonparametric relationships between real space coordinates, for example, X=F (y) and Z=G (y), can be shown both to restrict allowable curve or surface behavior and to produce undefined results under certain transformations. A cubic polynomial function is used because it is the simplest form capable of describing a curve which may twist in space and which may also have a point of inflection. Higher degree functions could have been used, for example, a quintic polynomial, but these introduce cumbersome and unnecessary complexities. A bicubic polynomial function is used because it is the simplest form capable of describing a surface whose boundaries are curves of the type described above and whose interior shape is controlled by analogous functions defining surface normals at these boundaries. PC functions are easy to express in the form of matrices, making geometric operations and analysis relatively simple matrix manipulations. Further, the simplicity of PC matrix expressions also allows economical application of computers to the solution of complex geometric problems. Finally, the use of a single, common mathematical format for representing any curve or surface drastically reduces the number and complexity of subroutines required to process and analyse the geometric relationships.

The surface itself will be called for the purposes of this discussion the "parametric bicubic" end surface. The surface is directly related to the PC curve and can be called the bicubic surface or the PC surface. "Patch" is another term which can be conveniently used to denote this surface. Patch is generally more meaningful to describe a single bicubic surface when many bicubic surfaces must be continuously joined to represent a complex physical or phenomenological surface.

The surface may be defined as a curve bounded collection of points whose position coordinates in three dimensional space are continuously defined by two-parameter, single valued mathematical functions. Thus:

x=f(u, w)
y=g(u,w)
z=h (u,w).

For bicubic surfaces, each real space coordinate is expressed as a bicubic function of the independent parameters u and w as seen in the equations above which are used to generate the x, y, and z values (the dependent variables) for the coordinates in three dimension space. Any surface may be considered to consist of an infinite number of points. Similarly, there are an infinite number of pairs of u, w values. There is a unique pair of u, w values in parametric space corresponding to each point in three dimensional x, y, z- space. In other words, a bicubic surface in real space is assembled point wise from its components in parametric space.

It is important to note that the bicubic surface is bounded by four curves. Each boundary curve turns out to be the PC curve. Though any of these curves may be degenerate curves containing only a single point, each has a unique characteristic which results in its name; i.e., the u=0 curve, the u=1 curve, the w=0 curve, and the w=1 curve. The boundary curves rise at the constant, limiting values of the parametric variables. There are also four unique corner points (u=0, w=0; u=0, w=1; u=1, w=0; and u=1, w=1). Consequently, a bicubic surface is generated by successive ordered pairs of the parametric variables u and w. As with the PC curve, an identical surface can be generated with the sequence of u, w values inverted. The choices of which boundary curve to make the u=0 curve and which to make the w=0 curve is arbitrary unless there is some external or computational constraint dictating a preferred or necessary order. Either way, there are no theoretical constraints or biases, and there is no practical distinction between possible u, w orders insofar as the resulting sets of points in x, y, z-space.

First a mathematical description of the surface of the part being flat patterned must be obtained. A surface may be defined by a curve-bounded collection of points whose position coordinates in three dimensional space are continuously defined by two parameter single-valued mathematical functions.

$x = f(u,w)$
$y = g(u,w)$
$z = h(u,w)$.

This mathematical surface information is then stored in some convenient form, such as a parametric bicubic patch.

To initiate the compound curved flat pattern process in this embodiment, three points are positioned on or off the surface. Point 100 is the starting point of the flat pattern and will be referred to as the collation reference point. This point will match the collation reference point on the completed flat pattern. Points 200 and 300 are chosen such that vectors to these points from point 100 indicate the directions of the axis of the material. The warp directon is chosen to coincide with a required orientation of that particular ply of a clothlike material.

If point 100 is located off of the surface, then an additional point 100A is projected down along a normal to the plane defined by point 100, 200 and 300 from point 100 and located on the surface. Similarly, if point 100 is located on the surface, an additional point 100A will be projected normal to the plane defined by points 100, 200 and 300 some convenient distance above it. In any event, the angle between the two vectors 100-200 and 100-300 should be 90° since this is the angle which the material will assume when it is cut as a flat sheet, although, as in embodiment no. 1, a 90° angle is not necessarily required.

Figure 6:
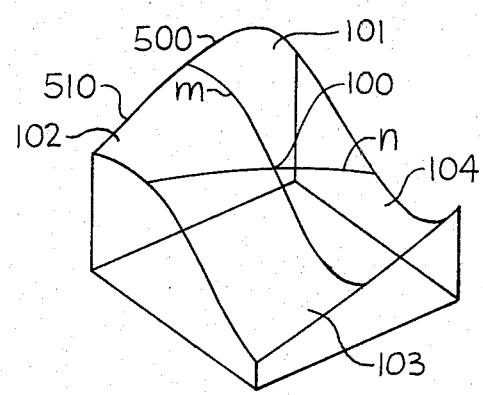
FIG. 6 shows the complex surface of FIG. 5 with tooling lines added and with the corresponding mapping plane.

Two cutting planes are now formed. A first cutting plane will intersect the three points 100A, 100 and 300. A second cutting plane will intersect the three points 100, 100A and 200. These cutting planes will then be extended to intersect the surface 500 as shown in FIG. 6. The intersection of these cutting planes upon the surface 500 will form the two tooling lines m and n which meet at the right angles at the starting point 100. Also shown in FIG. 6 is the corresponding flat pattern mapping plane with its axes m' and n' meeting orthogonally at point 100'. In these representations the perimeter of the compound curved surface is indicated as 510.

Figure 8:
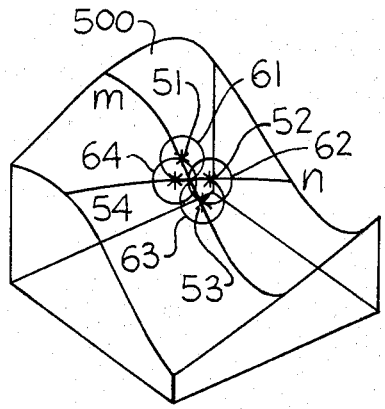
Figure 9:
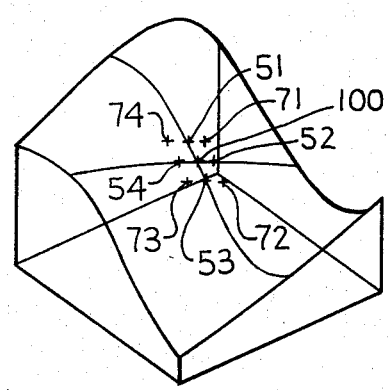
Figure 10:
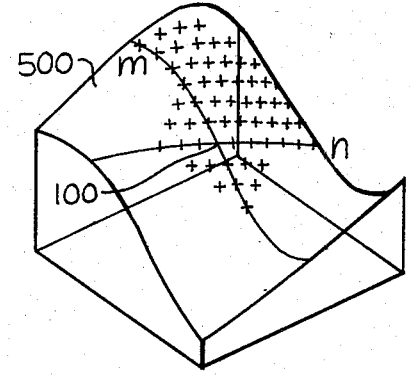
Figure 11:
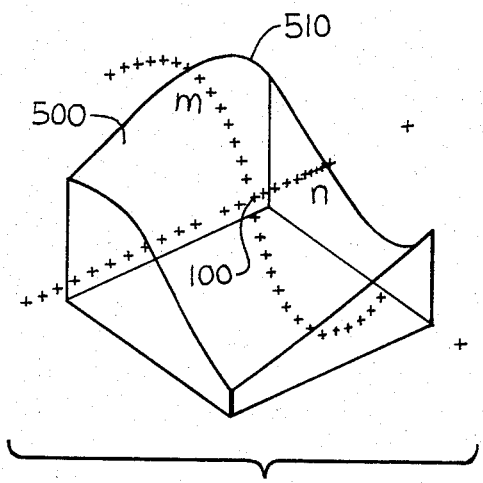
FIG. 11 shows the generated grid intersections constructed upon the tooling lines on the curved surface.

In a manner quite similar to that found in embodiment no. 1, using the intersection of the tooling lines m and n as a starting point or origin 100, a sphere 50 of radius 0.35 inch is constructed. The intersections of this spherical surface 50 with the tooling lines m and n produce four additional grid intersection points on the surface, here labelled 51, 52, 53 and 54. Then, as shown in FIG. 8, four additional spheres are constructed using these four points 51, 52, 53 and 54 as origins. The intersections of these adjacent spherical surfaces respectively 61, 62, 63 and 64 with each other and the compound curved surface 500 produce four additional grid intersection points on the surface as shown in FIG. 9 as points 71, 72, 73 and 74. As embodiment no. 1, the process or algorithm is repeated continuously (but always referenced to the tooling lines m and n) until the entire compound curved surface is covered with the constructed grid as indicated in FIG. 10. Here, as in embodiment no. 1, it is convenient to consider the problem one quadrant at a time. FIG. 11 shows the development of the grid intersections along the extended tooling lines even past the perimeter 510 of the compound surface 500 with their intersection marked as point 100.

Figure 12:
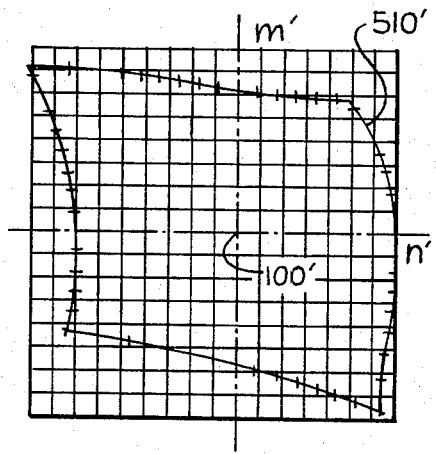
FIG. 12 shows the flat pattern equivalent to the complex curved surface developed in the preceding figures.

Then, as in embodiment no. 1, the various intersections of the perimeter 510 of the curved surface 500 are marked as they intersect the curved surface grid and are then transformed onto the flat pattern mapping plane shown in FIG. 12 Additional features, not shown, such as cutouts and rivet holes, would also be provided for in the same manner. Once again the tooling lines m and n from the curved surface translate onto the mapping plane as m' and n'. Similarly, the origin on the curved surface 100 translates onto the mapping plane as starting point 100' and as each of the intersections of the perimeter of 510 of the curved surface 500 are marked on the curved surface grid and transformed onto the mapping plane, the flat pattern perimeter 510' is generated.

As each leg of a quadrant is developed, every developed curved surface grid point along a face of the quadrant is checked as to its position relative to the surface boundary 510. When all the developed points are located outside the surface boundary 510 within a given quadrant, then the appropriate quadrant face is considered as fully developed. The individual boundary points or intersections of the perimeter 510 with the curved surface grid are transformed onto the flat mapping plane whenever a developed grid intersection point crosses the perimeter of the part. Thus, when a developed grid intersection point does cross the perimeter, its location is known in terms of increments of the curved surface grid network spacing. The flat pattern mapping grid is then drawn witn the same grid spacing as for the curved surface grid As a brief summary, a network of points is developed on a surface representing the part to be flat patterned. Each point is exactly the same chordal distance away from any adjacent point. Assuming that the lengths between the developed points do not bend or flex, the conformation of the cloth onto the curved surface is then caused by a "scissor action" of the lengths at the pivot points (the grid intersection points). This simulates the behavior of a woven fabric material and the atomic behavior of other materials. Darts, folds and wrinkles reveal themselves when the angle between the lengths reaches a sufficiently small angle. In fabric the lengths or threads have a finite thickness. Therefore, the angle formed between the lengths can only go down to about 45° before a cloth material will deform out of its original.

The method of this invention is versatile in terms of the shapes that it can handle. As was mentioned in the description of the prior art, differently shaped parts have required different methods to obtain a flat pattern in the past. With the method of this invention, any shape or size part can be flat patterned accurately. Addtionally, since this method shows the designer where a dart, fold or wrinkle will result in the material for a given orientation, the designer can choose a different collation point or orientation of the material which would move the dart or fold outside the edge of the part. Since the process is methodical and repetitive, it can be programmed into any existing computer system which has surface mathematics capability.

Figure 13:
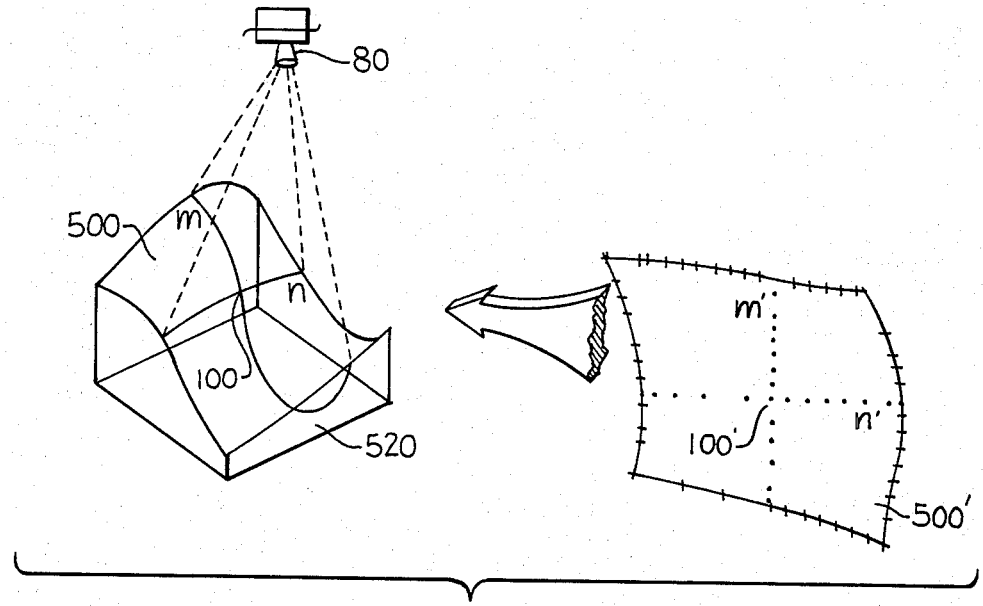
FIG. 13 shows one embodiment of a process for applying flat patterns to a tooling mold.

Once the flat pattern has been generated for a composite part, a fabric ply is cut out which is then applied to a lay-up tool. This process is shown in FIG. 13. The starting point 100 and tooling lines m and n are optically projected by suitable means 80 onto the lay-up tool 520. The flat patterned fabric 500' is then positioned on the lay-up tool 520 such that the starting point 100' and the tooling lines m' and n' which are marked on the fabric and the projected tooling lines m and n coincide. If the process is carried out correctly, the flat pattern will fit the curved surface exactly. Any internal features such as cutouts or rivet hole locations can be mapped accordingly by this process and exactly positioned on the lay up tool.

PROCESS SOFTWARE

The function of the software program is to develop flat patterns for textile-type (woven) and other deformable materials to be laid up or formed on compound-curved molds. The program uses certain operator-selected elements which describe a part and define the initial conditions of the material.

A brief discussion of flat patterns is in order to review the problems associated with obtaining them. In order to understand the significance of what the operator inputs to the program should be, it must be realized that there is not a single, unique flat pattern for any given part. A vast (theoretically infinite) number of flat patterns, all different, can be made that would fit the mold correctly. Several of the operator inputs should specify conditions which force a single, unique solution out of the many possible solutions.

The first parameter needed to arrive at a unique solution is the collation point on the surface, most easily explained by an analogy to the typical manual method of making flat patterns. The manual method involves cutting a piece of material more than large enough to cover the mold surface, laying it across the layup tool, and picking a point on the material to press against the surface of the layup tool. Now moving radially away from this point in all directons, the material is smoothed (wrinkle-free) against the surface until the entire mold surface is covered. At this point, the excess material beyond the edges of the part is trimmed off, and the trimmed material is removed from the tool and laid out flat in an undeformed condition. The material must be returned to its original condition if patterns are to be cut from undeformed material. Deformation of a material and flattening out is handled by the algorithm. This process results in a flat pattern which can be used as a template to cut additional pieces. If this process is repeated starting at a different point on the tool and smoothing the material from that point outward, a different flat pattern (but one that still fits) will result. This phenomenon may be clarified through an example. Most textile materials are woven with the warp (lengthwise) fibers crossing and the woof (crosswise) fibers at a 90 degree angle. When the material is laid up on a compound curved tool, the smoothing of the cloth against the tool forces the fibers to conform to the compound curvature by distortion of its weave; that is, the angle between its woof and warp fibers is forced to change locally in order to conform to the compound curvature of the tool. It should be noted that the starting point chosen represents a point where the cloth will remain in its original, undistorted condition, and that its location, therefore, affects the distribution of weave distortion across the entire mold surface. Although the assumption is made that the cloth will start out in a 90° angle between the woof and the Warp threads at the collating reference point, this may not always be the case. If the material is predeformed prior to placing it on the layup tool, then the angle between the woof and warp fibers at the collation reference point will not be 90°. This can be taken care of in the software package as will be discussed later. The assumption will be made hereinafter that, for practicality in the manufacturing process of the part, the cloth will be laid up as it comes from the bolt and not predeformed in any substantial or deliberate manner.

To illustrate the results that would be obtained by moving the starting point, the flat pattern of a section of a sphere will be used. Imagine cutting a sphere in half and then quartering the remaining hemisphere with two cuts perpendicular to the original equatorial slice. The surface of one of the octants shall represent the compound-curved surface to be flat patterned for this example.

If the layup of a clothlike material is started somewhere along the equatorial cut, deformation of the cloth weave will, by definition, be zero at that point; the woof and warp threads will cross at an as-manufactuted 90° angle. As the cloth is smoothed against the surface toward the remaining pole of the sphere, however, the weave will be forced into progressively greater deformation with maximum deformation occuring at the pole of the sphere. If the excess material around the edges is trimmed off and the cloth returned to its original 90° weave condition, maximum distortion of the originally planar cuts that created the flat pattern will occur in the area of maximum weave distortion of the laid-up cloth, i.e., at the pole. Conversely, minimum distortion of the trim cuts occur in areas of minimum weave distortion. In this particular example, the entire equatorial slice is covered with undistorted cloth and will, therefore, flat pattern as a straight line.

If the layup of cloth is started at the pole rather than at a point along the equator, the distribution of weave distortion will occur along the equator (the extreme ends) while the weave at the pole will be undeformed. This time the varying distortion along the equator will result in that trim slice not flat patterning to a straight line. Thus, we have two distinctly different flat patterns for the same part, both of which will fit correctly. Also, the starting orientation of the woof and warp of the fabric will determine the locations of deformations along the part's surface. The shape of a flat pattern will alter, even though the starting point may not have changed, just by changing the direction of the axes threads through the collation reference point.

The process software used in this embodiment comprises 19 subroutines which are listed below.

FPMAIN—the header routine for the Compound Curve Flat Pattern Software package.

FPMENU—prompts the user for information relating to the grid spacing and the minimum allowable deformation. The routine also analyses the pick information associated with the model to be flat patterned and collects information about the three points, surfaces, features to be developed, and the flat pattern plane.

FPMPFT—analyzes the picked features that are to be mapped on to a mapping plane.

FPSUMP—sets up a planar coordinate system (2D) onto which the flat pattern will be mapped.

FPSTUP—sets up the cutting planes on the surface which define the neutral axis.

FPSTRT—sets up the first four points along the axis from the starting point.

FPPLIM—determines within which quadrant features to be mapped fall.

FPCONT—the counter and logic which develops the grid on the surface.

FPPKPP—returns a new patch surface based on the patch which is worked at the time, and the border of that patch which was crossed.

FPPCD3—computes a point on a surface which completes a box, given three previously computed points.

FPPCD2—computes a point on a surface which is the same distance away from two previously computed points.

FPPCCK—determines if any picked features have crossed an Mface or an Nface of a developed box.

FPLOCP—checks the interior area of a developed box for any internal points which are to be mapped.

FPCKBD—checks a developed point for relative position based on the location of the point to the outside or inside of the patch presently being worked on.

FPGMAL—converts to a new patch geometry and algebra based on the new surface number input to the routine.

FPIPSC—intersects a space curve (arc) with a surface.

FPMAP—computes a feature point, which was based on its relative position to the woof and warp lines on the surface, on to the mapping plane.

FPDRBD—analyses the "mapped features" points and curve fits the results.

FPERR—error message routine which displays the correct error message based on an input parameter.

Figure 14:
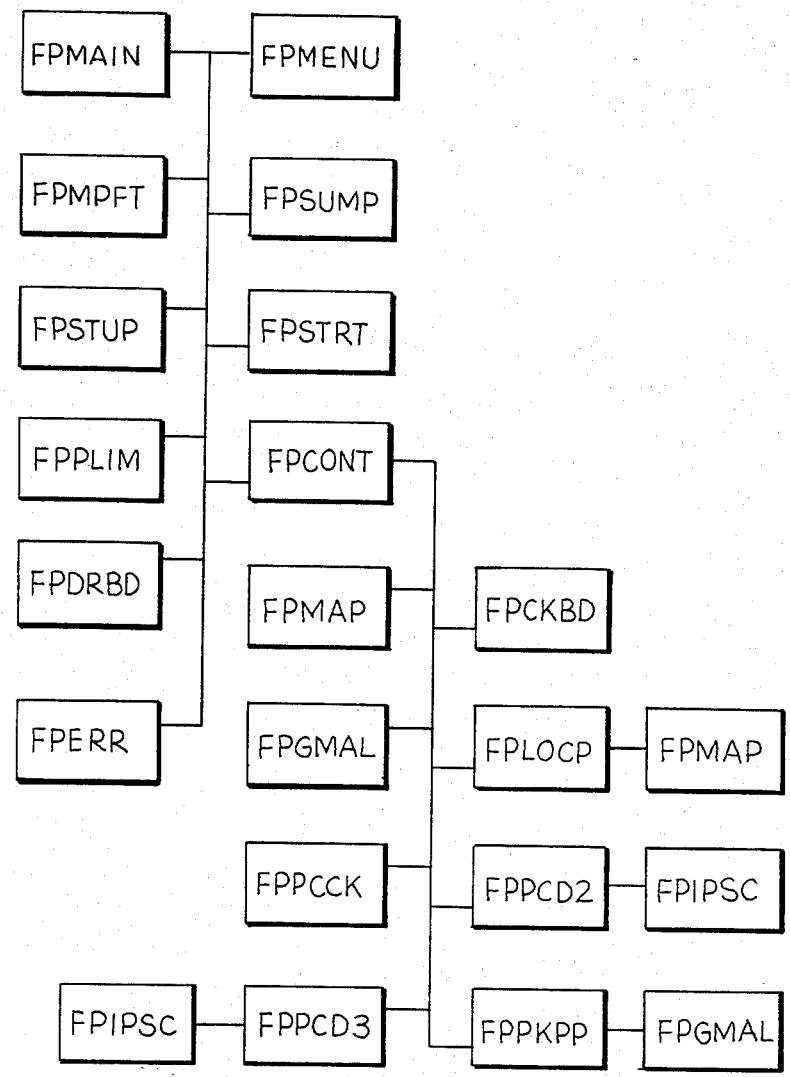
FIG. 14 is a flow chart of the system software.

A flow chart of the software package is illustrated in FIG. 14.

The following is a simplified description of the logic involved in obtaining a pattern:
1. Determine the subdivision of the surface (patches) to be flat patterned.
   a. The subdivisions will be called QUADRANTS.
   b. The quadrants will be labelled 101, 102, 103 and 104 in a counter clockwise direction (FIG. 6).
   c. The quadrants will share a common point called the collation reference point 100.
2. Label the axes of each quadrant as Mface (m) or Nface (n) as indicated in FIG. 6.
3. Do the following for all four quadrants:
   Note: This description is for quadrant 101. It will also hold true for all other quadrants.
   a. Obtain the Nface row.
   b. Check the row for any crossings on its Nface and Mface.
      (1) If a crossing occured, map the point of crossing.
   c. Check the row for any internal features or points.
      (1) If a feature is found, map the feature.
   d. If there were no face crossings, switch directions and continue with the next row.
   e. If there were face crossings, develop the direction of the crossing.
   f. This process continues until all the features in a quadrant have been all mapped.

The following definitions are included for a better understanding of the subroutines which are explained in more detail below.

Collation Reference Point (100)

A point on or adjacent to the surface to be flat patterned, analogous to the location on the surface at which the initial contact of the cloth and the surface takes place. From that initial point of contact, the cloth is smoothed onto the surface.

The "collation reference point" is also the starting point 100' on the flat pattern. This is described under the section dealing with the mapping of points.

Quadrants (101, 102, 103, 104)

The quadrants are defined by the intersection of two planes and the surface. The planes are defined as the direction of the weave of the cloth on the surface. One plane defines the woof direction while the other plane defines the warp direction. Both directions originate at the collation reference point 100. It therefore follows that the two planes intersect at a line which pierces the surface at the collation reference point.

The intersection of the surface and the planes define the quadrants.

Point Storage

The array which is used to develop a face is dimensioned (1000,2,6) for each face. This provides two levels for a face and a total of 1000 points per the two levels, per quadrant. As a third level is developed, it overwrites the level 2 part of the array. When level four is developed, level three is moved up.

The dimension of 6 contains information about each developed point and is stored in the following order:
1. X Coordinate in 3-space,
2. Y Coordinate in 3-space,
3. Z Coordinate in 3-space,
4. U the u value of the point on the patch,
5. W the w value of the point on the patch, and
6. PATNO the number of the patch within which the point falls.

As the program starts, points are developed along the picked features. These are stored in an array in the form (5000,9). This provides the capacity for 5000 points (or features) to be mapped. The information is in the following order:
1. X Coordinate in 3-space,
2. Y Coordinate in 3-space,
3. Z Coordinate in 3-space,
4. U the u value of the point on the patch,
5. W the w value of the point on the patch,
6. PATNO which is the patch number on which the point falls,
7. QUADNO which is the quadrant number in which the point falls,
8. CURVNO which is the pick number of the curve picked to be mapped, and
9. UCURVE the u value of the point on the picked curve from which the point came.

As the points are found within the surface, the x, y and z values in the array are replaced with the x, y and z values of the point as computed for mapping on the mapping plane. The following paragraphs describe the individual subroutines.

FPMAIN

The subroutine FPMAIN is the entry point for the software package The routine basically calls the subroutines necessary to develop a flat pattern.

FPMENU

The subroutine FPMENU splits up the user-picked information, needed in a later subroutine, into separate arrays. The three starting points, the two intersection lines, the surface, and the features to be mapped are all sorted, and the addresses of their locations in computer memory are stored in the appropriate arrays.

Menus prompt the user for input as to the grid size and the minimum allowable angle of deformation.

FPMPFT

The subroutine FPMPFT first loops through the array of picked PC curves. At each curve, a minimum of 10 points are computed. The points are a constant u value apart from each other. The points are projected to the patches in an effort to find the patch within which each point falls. The points are also located in relation to the quadrant system which are defined by the woof and warp cutting planes. This information is all stored in the array labelled MAPPCT. The knowledge of the location of the points relative to the quadrants is important. By knowing the number of points which must be found in any particular quadrant, it is possible to use this information to determine if all the points for that particular quadrant have been found, thereby ending the need for further development of that quadrant. A quadrant is developed in this manner: The rows of points which are computed will develop along a direction of any curve which happens to cross either the Nface or the Mface of the row. The algorithm will chase the feature along its general direction in order to map it fully. By having a check in the logic of the points yet to be found (or found already), one can alleviate the problem of ending in an infinite loop or, just as detrimental, of ending before all the points are found. If no features have been reached, the routine continues developing points in that quadrant because it has not found all the points in the quadrant.

FPSUMP

The subroutine FPSUMP sets up the mapping plane. The mapping plane is a flat surface onto which the flat pattern is developed. The plane is defined using two intersection lines which were user defined. The lines are intersected and the point of intersection is stored. This point will be defined as the mapped collation reference point 100'. It is about this point that the flat pattern will be developed. The plane itself is defined by the following points: one end point from a first of the two intersection lines, one end point from the second of the two intersection lines, and the collation reference point which marks the point of intersection of the two lines.

FPSTUP

Figure 5:
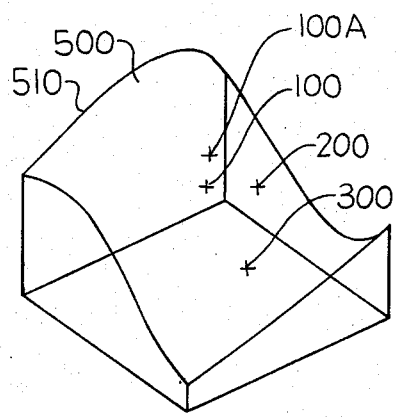
FIG. 5 shows the starting conditions for a complex curved surface as it would be handled by another embodiment of this process.

The subroutine FPSTUP sets up the cutting planes on the surface of the part to be flat patterned. The cutting planes are intersected with the surface to obtain two sets of curves which represent the woof and warp directions. The routine works as follows: Referring to FIG. 5, the collation reference point is labelled 100, the woof point direction is labelled 200, and the warp direction point is labelled 300. These points are user defined and the directions are based on a vector between points 200 and 100 and a second vector between points 300 and 100. The first line is the woof direction, and the second line is the warp direction. These two direction lines also define a plane which can be called either the working plane or plane A. Another plane is constructed which contains the woof direction line and which is perpendicular to plane A. This is the woof cutting plane. A further plane is constructed which contains the warp direction line and which is perpendicular to plane A. This is the warp cutting plane. The woof and warp cutting planes are intersected with the surface. These intersections on the surface are the woof and warp lines (or axis lines, lines n and m in FIG. 6, respectively).

FPSTRT

The subroutine FPSTRT computes the first points along the axis directions in each of the four quadrants. Using the collation reference point 100 as the starting point, the first partials with respect to u and w are obtained along each of the cutting plane directions. Traveling along the tangent vector to the starting point and in each of the cutting plane directions, a point is obtained which is a distance away from the starting point. The distance away is the grid spacing contained in the menu routine. Once each of the points is computed, the points are projected down to the surface. The new distance from the projected point to the starting point is checked and compared to the grid spacing. If the distance is different than the spacing, the point is adjusted until the distance is exactly the same as the grid spacing. Once the point is found, the coordinates of the point and the u and w of the points location on the patch are stored in a working array to be used later in the counter routine (FPCONT).

FPPLIM

The subroutine FPPLIM determines within which quadrant picked features fall. The routine uses the first starting direction vectors for defining the quadrants. The array (MAPPCT) contains the points, which were computed along the picked features, which will be checked. The routine loops through the array of points and creates a vector from each of the points to the collation reference point. This vector is checked relative to the direction vectors for determining within which area the vector falls. The quadrants are defined counter clockwise starting from the area in which the direction vectors both point. If there are no points (or features) in a quadrant, then the quadrant will not be developed.

FPCONT

The subroutine FPCONT is the main counter for the software package. The routine has a main loop which basically loops through the package for each of the four quadrants. Basically, the counter is split into two working sections, the Nface and the Mface sections. Each is identical and functions the same as the other with the exception of the method and order that the points are stored and retrieved. Once the routine starts a quadrant, a determination is made between which face is to be developed at which time. Beginning with the Mface section, the working patch information is set up within the patch where the points are presently located. FPPCD2 is called which obtains a new point along the axis (or woof/warp directions). Once the point is obtained, the point is input into FPCKBD which determines, based on the value of the u and w of the computed point, whether the point fell within the boundaries of the patch presently being worked. If the point falls outside the patch, then FPPKPP is called. The output of FPPKPP is a new patch and patch information. The point is then recomputed based on the new and correct patch data. The point is then stored in an array for further use later. The routine then calls FPPCD3 to obtain points within the fuadrant. Once a point is output from FPPCD3, the point is once again checked to make sure that it fell within the patch border. If the point is outside the patch, then a new patch is located, and the point is recomputed and stored. If a point falls off the patch and there is no new patch in the area, such as an edge of part, then the point will be computed based on the patch extension of the patch presently being worked. If a loop is encountered in a point which is claimed by neither the patch being worked nor the adjacent patch, then the adjacent four patches of the second patch are checked. This prevents a problem when the point computed falls outside the patch in a diagonal direction. Once the point is accepted and stored, FPPCCK is called to check for any crossings of a face of a developed box (by FPPCD3) and a curve (feature). The routine is called twice, once for each outward most edge. If a point or points are found, they are stored in the MAPPCT array, and they are also mapped by FPMAP. Once this has been done, a flag is set which determines which, if any, face was crossed by a feature. This will be used to determine which row will be computed next. If no edge was crossed, then a row in the opposite face is developed next. FPLOCP is then called to check if any points out of the MAPPCT array fall within the borders of the defined box. If they do, the point is marked in the array and mapped. The routine will loop back and forth until all the features in a quadrant are found and all the features of the surface are found and mapped.

FPPKPP

The subroutine FPPKPP outputs the new patch information based on which border of the old patch was crossed. Once a point has been known to cross a boundary, it is easy to find, based on the u and w of the point, which border of the patch was crossed. Once the border is known, a search is made to find patches which share the border. Once the new patch is found, the algebraic and geometric forms of the patch are easily obtained and output. If there were no other patches sharing the common border, then the original patch data is left unchanged.

FPPCD3

Figure 7:
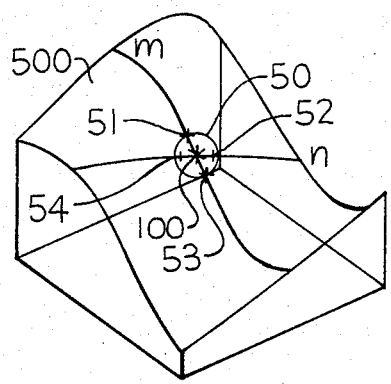
FIGS. 7, 8, 9 and 10 show various steps in the geometrical construction process which operate upon the complex curved surface.

The subroutine FPPCD3 developes a box in a quadrant on the surface. The development of a box is one of the first steps in obtaining the grid on the surface. The term "box" is really only one section of the network grid or fish net. Actually, a box is any four link closed section of the fishnet grid. Starting with the collation reference point 100, one obtains points 51 and 52 along the axis lines (refer to FIG. 7) at a distance (grid spacing) away from the collation reference point (this will be explained later).

The following description is a simplified version of the process. All the sides of the box are the same length. First, using point 51, construct a sphere with its origin at 51 and having a radius of "Distance." Once having that sphere, a second sphere is constructed with a radius of "Distance" and its origin at 52 as in FIG. 8. The two spheres are then intersected. The intersection of the two spheres results in a circle which is perpendicular to the surface at the collation reference point. Once the circle is obtained, it is then intersected with the surface. This intersection would result in two points on the surface.

In FIG. 9, the two points are labelled 100 and 71. Since we are interested in developing a box, clearly point 100 is at the same location as the collation reference point; therefore, the point that is needed to complete the box is point 71. One is left with four points which are on the surface, and all are the same distance apart from adjacent points.

Figure 15:
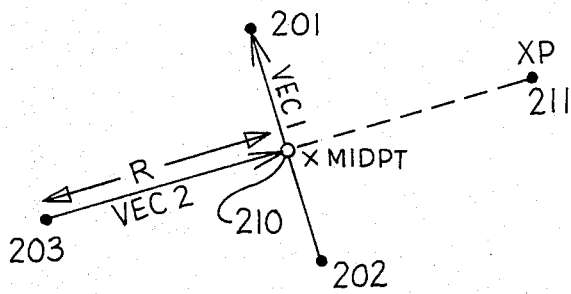
FIG. 15 is a diagram of the algorithm used in the FPPCD3 subroutine.

The actual method of obtaining the points is described hereinafter with reference to FIG. 15. Create a vector (VEC 1) from 201 to 202 (two opposite points in the uncompleted box) and normalize the vector. Obtain the midpoint of 201 and 202 XMIDPT 210. Using VEC 1, create a plane normal to the VEC 1 direction which includes point 210. Create a vector VEC 2 from XMIDPT to point 203 (the remaining point of the uncompleted box) and normalize it. Obtain the length of the segment from XMIDPT to 203 (R). Now, adding the length R to XMIDPT in a VEC 2 direction, obtain point XP 211. Now assume that XMIDPT is at the center of a circle, and R is the radius, and XP is the first guess point. Now go to the routine (FPIPSC) which will intersect the space curve (circle) with the surface to obtain the remaining corner point of the developed box on the surface.

FPPCD2

Figure 16:
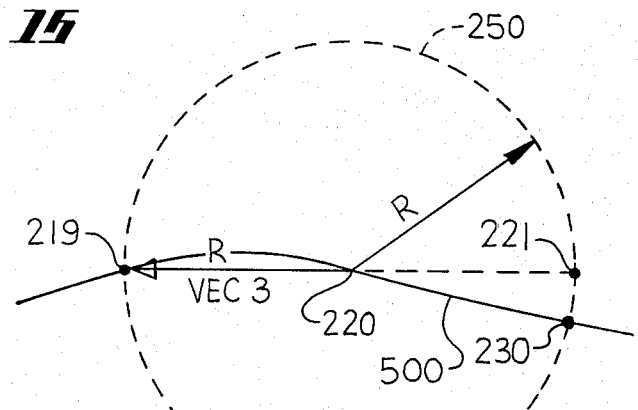
FIG. 16 is a diagram of the algorithm used in the FPPCD2 subroutine.

This subroutine computes an axis point on the curved surface which is the chordal distance beyond the second of two previously computed axis points. Referring to FIG. 16, 219 and 220 develop an axis point, obtain a previous point 220 and develop a sphere of radius R about that point. Then the sphere is intersected with the axis curve. For the next successive axis point, a vector is created from point 20 to point 219 (VEC 3) and normalized. An additional point 221 is obtained by starting at point 20 and traveling along VEC 3 for a distance which was previously picked by the user as the grid space. This ends up being the input into the routine (FPIPSC) which intersects the constructed space curve (circle 250) and the surface (500) to yield the desired next axis point 230.

FPPCCK

This subroutine determines if any picked surface features have crossed an Mface or an Nface of a developed box. Each grid row is made up of four-sided equilateral polygons (boxes) which are arranged side by side. As each polygon is developed, the two sides which are formed by the new corner point and relative to the Nface and Mface are checked for crossings by selected surface features (the picked curves that are to be mapped).

Assume that a feature has crossed one of the faces of an individual grid element. There will normally be no true intersection of the face and the curved surface, since the face chord will not normally intersect the curved surface at the feature point. Therefore, the apparent intersection is obtained.

First a plane is identified which contains the end points of the face chord and is perpendicular to the surface at one of the end points. Then it is easy to project the feature point in the plane to the face chord for mapping onto the flat pattern map. All the curves are intersected with the constructed plane. When a point is found, it is checked for location within the limits of the two points which define the face. If the point falls within the points (of face), then the point is mapped.

FPLOCP

Figure 17:
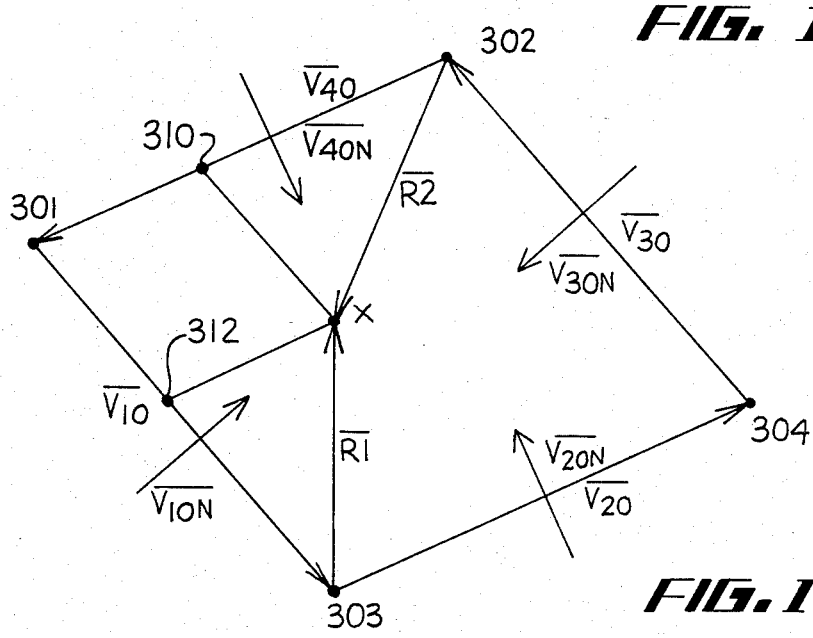
FIG. 17 is a diagram of the algorithm used in the FPLOCP subroutine.

As each box is constructed, this subroutine checks for points located within the borders of the box. The four vertices of the box are labelled 301, 302, 303 and 304 as shown in FIG. 17. Vector 10 is defined from 301 to 303. Vector 20 is defined from 303 to 304. Vector 30 is defined from 304 to 302. Vector 40 is defined from 302 to 301. X is the point which is to be checked. First, it must be determined if the point is located within the borders of the box formed by the four points.

Obtain the normal vector to vectors 10 and 40 through point 301 and in a positive direction. By crossing this normal vector with each side's vector (V10, V20, V30, V40), four normal vectors are obtained in which all the vectors point to the "inside of the box" V10N, V20N, V30N, V40N. Using a vector called R1, from 303 to X, and R2 from 302 to X, employ the dot product to determine the location of the point. Dot R1 with V20N and V10N. If the two dot products are positive, then the point is on the inside of V10 and V20. Dot R2 with V40N and V30N and, if the dot products are positive, then the point is on the inside of V30 and V40. Once it is determined that the point is inside the box, the location of the point relative to point 301 within the box will be obtained.

Since the vectors which define the sides of the box are known, they can be used to determine the location of the point X relative to 301. First reverse the direction of V10 and translate it to originate at point X. Then intersect this transformed vector with V40 to obtain point 310, and, in a similar manner, obtain point 312. Using the ratio of the distance of point 310 to point 301 and the distance of 301 to 302, a ratio of the distance of point X from 301 in a V40 direction is found. The ratio of the distance point 312 from 301 compared to the distance 301–303 gives the relative distance of X along the V10 direction. This results in a relative location of point X to 301 in the local axis system defined by V10 and V40. The point can then be mapped.

FPCKBD

This subroutine checks the position of a point relative to a patch being currently computed. As was previously described, boxes are constructed to form rows of a face. Since the surface is made up of patches, and it is important to know which patch geometry to work with, a check must be made after each box is developed to see if the point just developed is in the geometry of the correct patch. If a point is developed using patch 1 geometry and the point falls outside the patch 1 border, it will fall on the extension of the patch 1, and it would be wrong. Therefore, the point must be redeveloped using the patch 2 Patch data.

FPGMAL

This subroutine converts the stored patch coefficients from the stored geometric form to the algebraic form of the patch. This routine is a mathematical procedure.

FPIPSC

This subroutine intersects a space curve (arc) with the surface. The input to this routine is in the form of the geometric form of the patch and a circle. The circle is converted to the form of a parametric curve. A function curve is developed from a guess u and w on the patch to the XP point on the curve. The distance between the points is checked and the derivatives of the point on the patch are obtained. A Newton-Rapson iteration moves the point on the patch in the direction of the point on the curve. When the points are exactly the same, then the u and w of the point are known. The u and w are evaluated by the blending functions of the patch and the X, Y and Z values are features which cross the faces of the row.

FPMAP

This subroutine transforms a feature point from the surface grid to the mapping plane. The mapping of a point is relatively easy. The mapping plane is defined by the intersection of two picked lines. The intersection of these two lines is the mapped collation reference point. The picked points on the surface determine the woof and warp directions on the surface, and the first line picked of the two mapping plane lines corresponds to the woof direction on the surface. As each point is found, either a crossing of a box face or an internal feature, its position is known by:
(1) quadrant location,
(2) row and column,
(3) the relative distance to a box corner point,
(4) length of a box side.

In the mapped condition Mface and Nface form a 90° angle. So, by knowing the length of the sides of a box and the number of boxes for each direction, the point can be mapped.

FPDRBD

This subroutine analyzes the mapped feature points and curve fits the results. Once all the points to be mapped are mapped, the array in which the points are stored is evaluated. The important information about the point is:
(1) the collation curve features to the individual mapped points; and
(2) the u values of the points along that curve.

First the array is looped through to find points from a common curve. These points are then sorted in order of the u values from 0 to 1. If a point has a value of less than 0 or greater than 1, it is dropped from the list. The points are then input into a curve fitting routine. The points that were picked as features, such as tooling holes or rivet pattern holes, clearly are not curve fit.

The need for an accurate flat pattern method is well known in a number of different industries. The automobile industry requires flat patterns for parts such as fenders, bumpers, roofs, etc. In the aircraft industry, the need for flat patterns is even greater. Components such as speed brakes, wing skins, fuselage components, and internal parts must be flat patterned. By utilizing this method, the requirement that the individual plies be laid up and trimmed by hand is eliminated, thus opening the way for new concepts in material handling and ultimately large cost savings in the fabrication of composite parts.

We claim:

1. A process for forming an article comprising bonded multiple plies of a woven material arrayed to form a compound curved surface, the process comprising:

forming a unique flat pattern equivalent for the compound curved surface for each ply wherein the flat pattern and the compound curved surface each have common reference means;

forming each ply to correspond to its flat pattern equivalent;

laying up the plies upon a tool which duplicates the compound curved surface wherein the plies and the tool also have the common reference means such that each ply is referenced to the common reference means on the tool; and bonding the plies together to form the article wherein said step of forming a unique flate pattern equivalent for the compound curved surface comprises:

forming two tooling lines upon a portion of the surface such that the lines intersect within the boundaries of the portion;

forming a surface grid of quadrilateral elements with identifiable points at the vertices of the elements upon the surface such that each of the points is separated from an adjacent point by an identical chordal distance, one such point being coincident with the intersection of the tooling lines, and two groups of such points being formed at consecutive said identical chordal distances along the tooling lines;

marking the intersections of selected surface features of the portion of the surface with the surface grid;

forming a flat pattern grid having a grid of quadrilateral elements having a grid spacing equal to the chordal distance; and, determining a flat pattern equivalent for the portion of the compound curved surface by translating the compound curved surface grid containing the marked intersections onto the flat pattern grid.

2. The process of claim 1 wherein the tooling lines correspond to the woof and warp of the woven material.

3. The process of claim 1 wherein the flat pattern grid is an orthogonal grid.

4. The process of claim 1 wherein the common reference means comprise two tooling lines which intersect at a collation point.

5. The process of claim 1 wherein the woven material comprises carbon fiber cloth.

6. The process of claim 1 wherein the woven material comprises glass fiber cloth.

7. The process of claim 1 wherein the woven material comprises polyaramid fiber cloth.

8. The process of claim 1 wherein the woven material comprises boron fiber cloth.

9. A process for forming an article comprising at least one layer of an initially flat deformable material arrayed to form a compound curved surface, the process comprising:

forming a unique flat pattern equivalent for the compound curved surface for said at least one layer wherein the flat pattern and the compound curved surface each have common reference means;

forming said at least one layer to correspond to its flat pattern equivalent;

laying up said at least one layer upon a tool which duplicates the compound curved surface wherein said at least one layer and the tool also have the common reference means such that said at least one layer is referenced to the common reference means on the tool; and, forcing said at least one layer onto the tool to form the article, wherein said step of forming a unique flat pattern equivalent for the compound curved surface comprises:

forming two tooling lines upon a portion of the surface such that the lines intersect within the boundaries of the portion;

forming a surface grid of quadrilateral elements with identifiable points at the vertices of the elements upon the surface such that each of the points is separated from an adjacent point by an identical chordal distance, one such point being coincident with the intersection of the tooling lines, and two groups of such points being formed at consecutive said identical chordal distances along the tooling lines;

marking the intersections of selected surface features of the portion of the surface with the surface grid;

forming a flat grid having a grid of quadrilateral elements having a grid spacing equal to the chordal distance; and, determining a flat pattern equivalent for the portion of the compound curved surface by translating the compound curved surface grid containing the marked intersections onto the flat grid.

10. The process of claim 9 wherein the tooling lines correspond to the neutral axis lines of the deformable material.

11. The process of claim 10 wherein the deformable material is selected from the group consisting of aluminum and aluminum alloy sheet, titanium and titanium alloy sheet, steel and steel alloy sheet, tin and tin alloy sheet, glass sheet, and hydrocarbon polymer plastic sheet.

* * * * *